A. STUBER.
CAMERA.
APPLICATION FILED MAR. 7, 1917.
1,286,892. Patented Dec. 3, 1918.
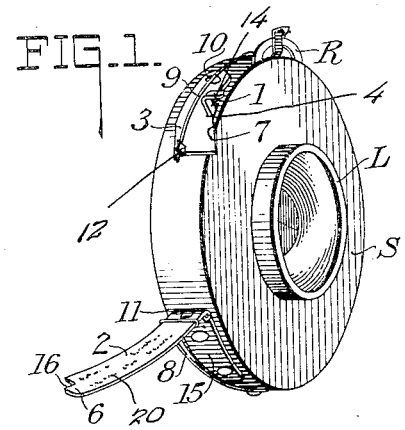
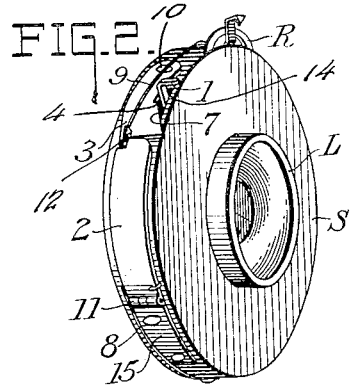
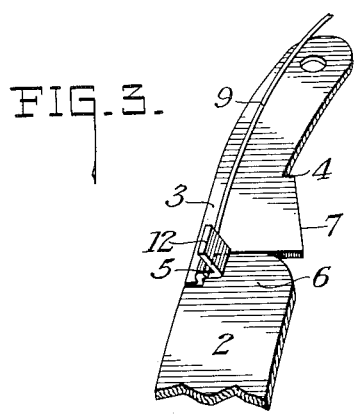
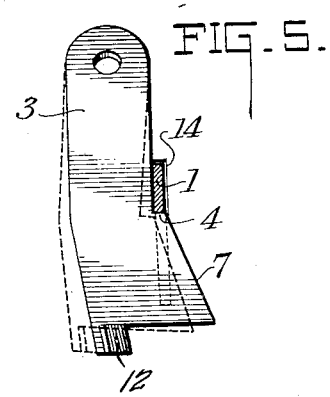
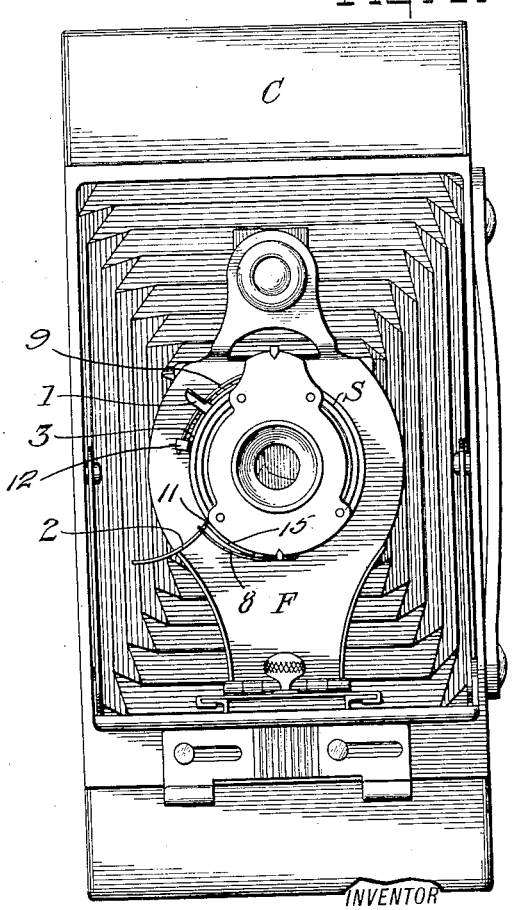
WITNESSES:
INVENTOR
Adolph Stuber,
BY
ATTORNEY

UNITED STATES PATENT OFFICE.

ADOLPH STUBER, OF ROCHESTER, NEW YORK, ASSIGNOR TO EASTMAN KODAK COMPANY, OF ROCHESTER, NEW YORK, A CORPORATION OF NEW YORK.

CAMERA.

1,286,892.  Specification of Letters Patent.  Patented Dec. 3, 1918.

Application filed March 7, 1917. Serial No. 153,011.

*To all whom it may concern:*

Be it known that I, ADOLPH STUBER, a citizen of the United States of America, residing in Rochester, in the county of Monroe and State of New York, have invented certain new and useful Improvements in Cameras; and I do hereby declare the following to be a full, clear, and exact description of the same, reference being had to the accompanying drawings, forming a part of this specification, and to the reference-numerals marked thereon.

This invention relates to photographic cameras and more particularly to locking and signaling devices therefor. The principal object of this invention is to provide a locking and signaling device which will prevent the unintentional making of two or more exposures upon the same area of the plate or film in the camera. Other objects will hereinafter appear.

In the drawing, in which like characters represent the same parts in the several views, Figure 1 is a perspective view showing the preferred form of the invention attached to a shutter with the shutter lever locked and the signal arm in its open or displaying position.

Fig. 2 is a perspective view with the parts of the device interengaged so as to permit actuation of the shutter.

Fig. 3 is a perspective view on an enlarged scale of some of the interengaged parts shown in Fig. 2.

Fig. 4 is a front elevation of a roll film camera on the shutter of which my invention is mounted, the signal arm being shown in the open position.

Fig. 5 is a side elevation of one of the parts of my device in one of its positions, another position thereof being indicated by dotted lines. The shutter actuating lever is shown in section.

For illustration I will describe the preferred embodiment of my invention as applied to the shutter S mounted on the front F of a common type of roll film camera C, the shutter being provided with the usual lens tube L and regulating means R. It should be understood, however, that my invention is applicable to other types of cameras whether they employ plates or films and may be adapted to various types of shutters whether they require setting or not prior to exposure.

The illustrative shutter S is of the type which requires no setting and is released by moving the actuator lever 1 along the slot 14. Pivoted at 10 to the shutter casing above the lever 1 is a controlling member 3 which is bent to conform to the curvature of the shutter casing. This member carries a locking lug 4 adapted, in one of its positions, to catch under and hold the lever 1, as shown in Figs. 1 and 5. The member 3 is provided with a cam surface 7 adapted to be engaged by the lever 1 and also carries a catch-holding lug 5 upon which is mounted a restoring cam 12. A spring 9 fastened to the top of the shutter casing and pressing in back of the cam 12 constantly tends to turn the member 3 about its pivot 10 toward lever 1.

Coöperating with member 3 is a signaling arm 2 hinged at 11 on the lower part of the shutter to a plate 15 which is riveted in place. A spring 8, fastened to the lower part of the shutter and engaging the signaling arm above but adjacent to the hinge, constantly tends to press the arm outwardly to the position shown in Figs. 1 and 4. Arm 2 is provided at its outer extremity with a catch 6, upon the side face of which is an edge 16 adapted to coöperate with cam 12, the catch 6 engaging under the catch-holding lock 5 in one of the positions of the device. The arm 2 is also bent to approximately conform to the shape of the shutter casing and, if desired, may bear a signal or warning 20, such as "Have you wound your film" upon the upper face which is visible in the open position.

The use of the device is as follows:

Starting with the parts in the position shown in Fig. 1, the lever 1 is locked by lug 4 so that the shutter cannot be operated and signal arm 2 being open, warns the operator that the film should be rewound. After a fresh area of film has been brought into position in the camera, the operator presses arm 2 upwardly about hinge 11, bringing edge 16 into engagement with restoring cam 12. This engagement causes member 3 to be turned backwardly about its pivot 10 until catch 6 slips under catch-holding lug 5. The parts are thus brought to the position shown in Figs. 2 and 3 and indicated in dotted lines in Fig. 5. Lug 5 prevents arm 2 from flying outwardly and catch 6 prevents member 3 from turning about its pivot. Catch 6 is so located that it holds member 3 and lug 4 out of locking engagement with lever 1 but the cam 7 is located in the path of movement of said lever. Thus the parts are made ready for another exposure.

When the operator desires to take the next picture, he operates the shutter by pressing on the lever 1 which in turn engages the cam 7, moving member 3 rearwardly until lug 5 slips off of catch 6, whereupon the signal arm 2 flies out to its open or displaying position, as shown in Figs. 1 and 4. When the operator lets go of the lever 1 it moves to its upper position, as is common in shutters of this type. When it reaches its uppermost position, spring 9 turns member 3 against the lever 1 thus placing the lug 4 in locking position. The operator being warned by the signal now winds a fresh area of film into place and repeats the above cycle of operations.

I claim:

1. In a camera, a shutter, an actuating lever therefor, a locking lug engageable with the lever to prevent actuation thereof and a part integral with the lug and engageable by the lever to cause said lug to assume an operative position.

2. In a camera, a shutter, an actuating lever therefor, a member adapted to engage and lock the lever and means to prevent such engagement, the lever being adapted in its movement to engage the member and thereby release the member from the influence of the preventing means.

3. In a camera, a shutter, an actuating lever therefor, a member adapted to engage and lock the lever, and means to prevent such engagement, the lever being adapted in its movement to engage the member and thereby release the member from the influence of the preventing means, said preventing means serving also as a signal.

4. In a camera, a shutter, an actuating lever therefor, a member having one part adapted to engage and lock the lever against movement, and means to prevent such engagement, said member having a second part extending across the path of movement of the lever, the releasing of the elements being such that engagement of the second part by the lever causes the release of the member from the influence of the preventing means.

5. In a camera, the combination of a shutter and an actuating lever therefor, with a resilient locking means tending to maintain engagement with the lever to prevent operation of the shutter, a releasable catch engagable with the locking means to hold it in a non-locking position but in the path of the shutter actuating lever, and means for moving the locking means out of engagement with the catch upon movement of the shutter lever, allowing the locking means to engage with said lever.

6. In a camera, the combination of a shutter and an actuating lever therefor, with a resilient locking member tending to maintain engagement with the lever to prevent operation of the shutter, a releasable catch engageable with the locking member to hold it in a non-locking position, and a cam coacting with said lever and locking member to release the catch upon actuation of the shutter lever.

7. In a camera, the combination of a shutter and an actuating lever therefor with a resilient locking member, a locking lug thereon engageable with the lever to prevent actuation thereof, a catch holding lug on the member, a releasable spring actuated signal arm and a catch engageable with the catch holding lug to hold the locking member in a non-locking position and a cam on said member in the path of the shutter lever when the latter is unlocked which is moved by the lever during operation of the shutter to release the catch and signal arm to a signaling position and permit the locking lug to engage the shutter lever after an exposure has been made to prevent further movement thereof before releasing the locking lug from engagement therewith.

In testimony whereof, I have signed this specification in the presence of two witnesses this 5th day of March, 1917, at Rochester, N. Y.

ADOLPH STUBER.

Witnesses:
R. L. STINCHFIELD,
HELEN M. FRASER.